US009336463B2

(12) United States Patent
Ishikawa

(10) Patent No.: US 9,336,463 B2
(45) Date of Patent: May 10, 2016

(54) IMAGE FORMING APPARATUS CAPABLE OF CHANGING PARTITIONS OF STORAGE UNIT, AND CONTROL METHOD AND STORAGE MEDIUM THEREFOR

(71) Applicant: CANON KABUSHIKI KAISHA, Tokyo (JP)

(72) Inventor: Akira Ishikawa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 13/678,645

(22) Filed: Nov. 16, 2012

(65) Prior Publication Data
US 2013/0141762 A1 Jun. 6, 2013

(30) Foreign Application Priority Data

Dec. 5, 2011 (JP) .................................. 2011-265907

(51) Int. Cl.
*G06K 15/00* (2006.01)
*H04N 1/21* (2006.01)
*G06F 13/00* (2006.01)

(52) U.S. Cl.
CPC . *G06K 15/00* (2013.01); *H04N 1/21* (2013.01)

(58) Field of Classification Search
None
See application file for complete search history.

(56) References Cited

U.S. PATENT DOCUMENTS

| 7,487,324 B2* | 2/2009 | Tanaka ......................... 711/173 |
| 7,921,262 B1* | 4/2011 | Dash et al. .................... 711/154 |
| 8,453,036 B1* | 5/2013 | Goel et al. .................... 714/763 |
| 2008/0088861 A1* | 4/2008 | Kondo ........................... 358/1.9 |
| 2011/0167419 A1 | 7/2011 | Ishikawa |

FOREIGN PATENT DOCUMENTS

| JP | 09-016337 A | 1/1997 |
| JP | 2000231454 A | 8/2000 |
| JP | 2011095952 A | 5/2011 |
| JP | 2011141696 A | 7/2011 |

OTHER PUBLICATIONS

Tsuji, Shuntaro; JP 2011095952 A; May 2011.*
Office Action issued in JP2011-265907, mailed Jul. 21, 2015. English translation provided.
Office Action issued in JP2011-265907, mailed Jul. 21, 2015.
Office Action issued in Japanese Appln. No. 2011-265907 mailed Mar. 22, 2016.

* cited by examiner

*Primary Examiner* — Marivelisse Santiago Cordero
*Assistant Examiner* — Neil R McLean
(74) *Attorney, Agent, or Firm* — Rossi, Kimms & McDowell LLP

(57) ABSTRACT

An image forming apparatus capable of changing partitions of a storage unit without using another storage unit stored with a system for partition change. At startup of the image forming apparatus, a file system is developed on a DRAM from a flash memory and executed by a CPU of the image forming apparatus. When determining that partition change is to be performed, a partition change module that operates on the CPU performs the partition change in a state where the flash memory is not mounted. Subsequently, an operating system placed on the flash memory is started up.

8 Claims, 7 Drawing Sheets

IMAGE FORMING APPARATUS CAPABLE OF CHANGING PARTITIONS OF STORAGE UNIT, AND CONTROL METHOD AND STORAGE MEDIUM THEREFOR

BACKGROUND OF THE INVENTION

1. Field of the Invention

The present invention relates to an image forming apparatus capable of changing partitions of a storage unit, a control method therefor, and a storage medium storing a program for executing the control method.

2. Description of the Related Art

In an information processing apparatus, e.g., in an image forming apparatus such as a multi-function peripheral, a general-purpose operating system (OS) such as Linux (registered trademark) is generally used.

To this end, system software including the general-purpose OS is placed on a file system created on a nonvolatile memory, and the nonvolatile memory is used as a startup disk to start up the image forming apparatus.

The nonvolatile memory is partitioned in some cases. File systems are provided for respective partitions, and firmware files (such as OS), system data, and user data are placed on different partitions. Files and data placed on respective partitions do not interfere with one another, and even if user data is over capacity, user data overflow does not interfere with a system data area. This makes it possible to avoid an inconvenience that the image forming apparatus becomes unable to start up due to the user data overflow.

A partition configuration (the number of partitions and sizes of respective partitions) decided in software configuration design is sometimes subsequently changed to eliminate problems or to expand functions. However, when a nonvolatile memory stored with an OS for partition change is subjected to a partition change, the OS randomly accesses to its own file system. As a result, an OS mismatch is caused and the OS becomes inoperable.

In, e.g., Japanese Laid-open Patent Publication No. H9-16337, a partition change method has been proposed, in which partitions of a storage unit to be subjected to a partition change are changed by means of a system for partition change that is stored in another storage unit other than the storage unit subjected to partition change. With this proposal, however, in order to change partitions of a nonvolatile memory, it is necessary to prepare another nonvolatile memory stored with a system for partition change, posing a problem of cost-up.

SUMMARY OF THE INVENTION

The present invention provides an image forming apparatus capable of changing partitions of a storage unit without using another storage unit stored with a system for partition change, a control method therefor, and a storage medium storing a program for executing the control method.

According to one aspect of this invention, there is provided an image forming apparatus comprising a printing unit configured to perform printing, a volatile storage unit, a nonvolatile storage unit configured to be stored with a file system and divided into a plurality of partitions, wherein the plurality of partitions include at least an image development partition in which an image to be printed by the printing unit is developed, a development unit configured to develop the file system on the volatile storage unit, and a change unit configured to change at least one to-be-changed partition of the plurality of partitions of the nonvolatile storage unit by using the file system developed by the development unit, wherein the change unit saves data in the to-be-changed partition into the image development partition, and changes the to-be-changed partition after the data has been saved into the image development partition.

With this invention, it is possible to change partitions of a storage unit without using another storage unit stored with a system for partition change.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1:
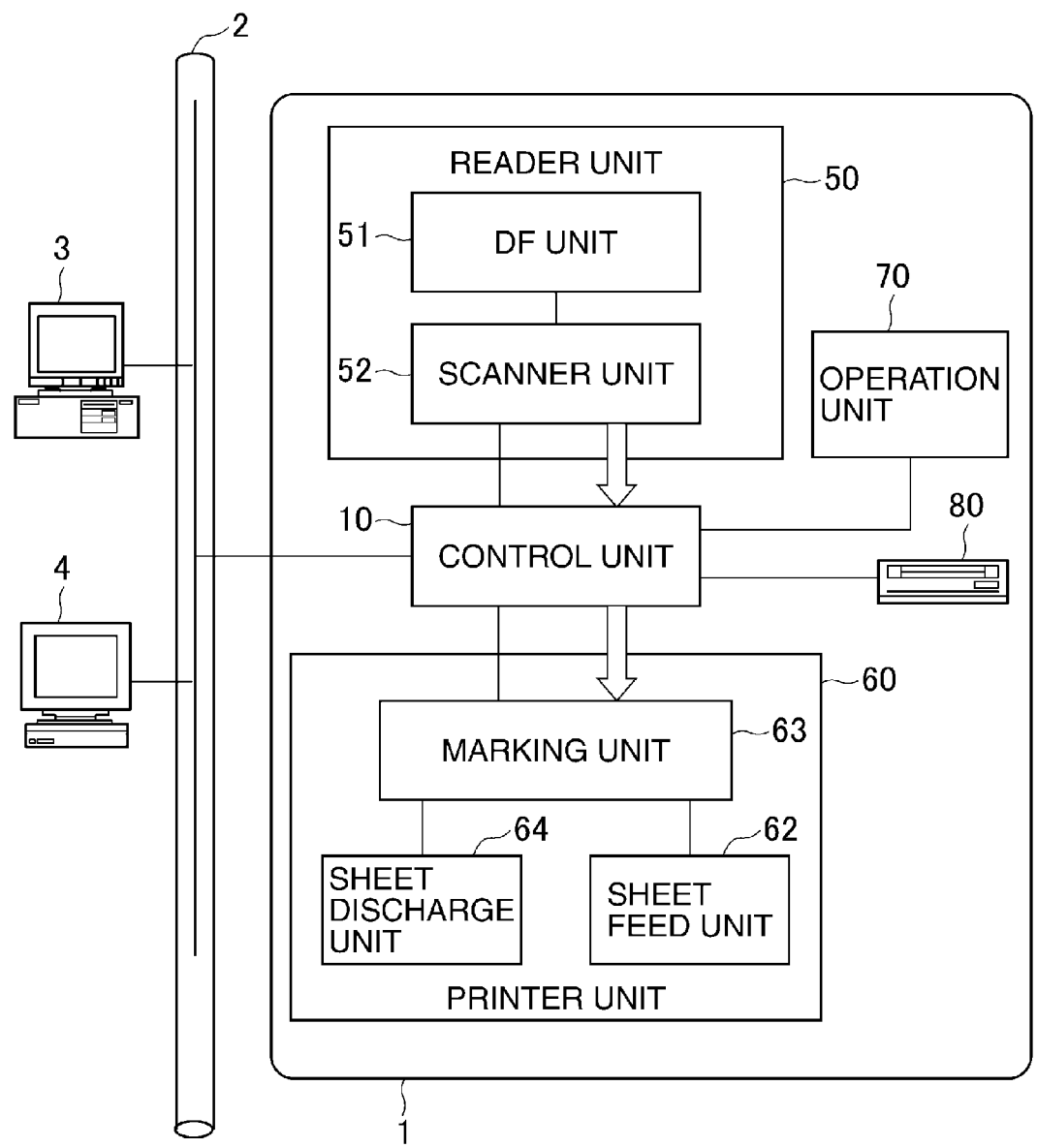
FIG. 1 is a block diagram showing an example construction of an image forming apparatus according to a first embodiment of this invention.

FIG. 1 is a block diagram showing an example construction of an image forming apparatus according to a first embodiment of this invention. In the following, a description will be given of a case where this invention is applied to an image forming apparatus comprised of a multi-function peripheral (MFP) having plural functions such as copy function and printer function. However, this invention is also applicable to an SFP (single function peripheral) having only the copy function or only the printer function, or an information processing apparatus (such as a computer having a startup disk) other than the image forming apparatus.

In FIG. 1, reference numeral 1 denotes an image forming apparatus, which is configured as a multi-function peripheral. The image forming apparatus 1 is connected to a network, e.g., a LAN 2 configured by Ethernet (registered trademark) or the like, and connected via the network to PCs 3, 4. It should be noted that PCs (not shown) other than the PCs 3, 4 and/or image forming apparatuses (not shown) other than the image forming apparatus 1 can be connected to the LAN 2, and image forming apparatuses (not shown) can be connected to the PCs 3, 4.

The image forming apparatus 1 has a control unit 10 and has a reader unit 50 and a printer unit 60 that are connected to the control unit 10 and operate under the control of the control unit 10. The control unit 10 receives various data from the reader unit 50, transmits various commands to the reader unit 50 and to the printer unit 60, and receives image data and control commands from the PC 3 or 4 via the LAN 2. Each of the PCs 3, 4 monitors e.g. the configuration and current status of the image forming apparatus 1.

The reader unit 50 includes a document feed unit (DF unit) 51 and a scanner unit 52. The DF unit 51 conveys an original to a position where the an image of the original can be read by the scanner unit 52.

The printer unit 60 includes a sheet feed unit 62, a marking unit 63, and a sheet discharge unit 64.

The sheet feed unit 62 includes sheet feeders such as sheet feed cassette, sheet feed deck, and manual sheet feed tray, and can house plural types of sheets such as plain paper and glossy paper. Sheets printed by the printer unit 60 can be housed in the sheet feeders again.

The marking unit 63 performs, e.g., electrophotographic processing according to image data to form an image on a sheet conveyed from the sheet feed unit 62. After the image formation (printing), the sheet is discharged by the sheet discharge unit 64. It should be noted that sorting, stapling, or other processing can be performed on printed sheets in the sheet discharge unit 64.

The operation unit 70 includes, e.g., hard keys and a liquid crystal display device provided with a touch panel. The operation unit 70 accepts a user's instruction and transmits to the control unit 10 a command corresponding to the user's instruction. The liquid crystal display device displays soft keys, and displays the functions and operation state of the image forming apparatus 1.

Figure 3:
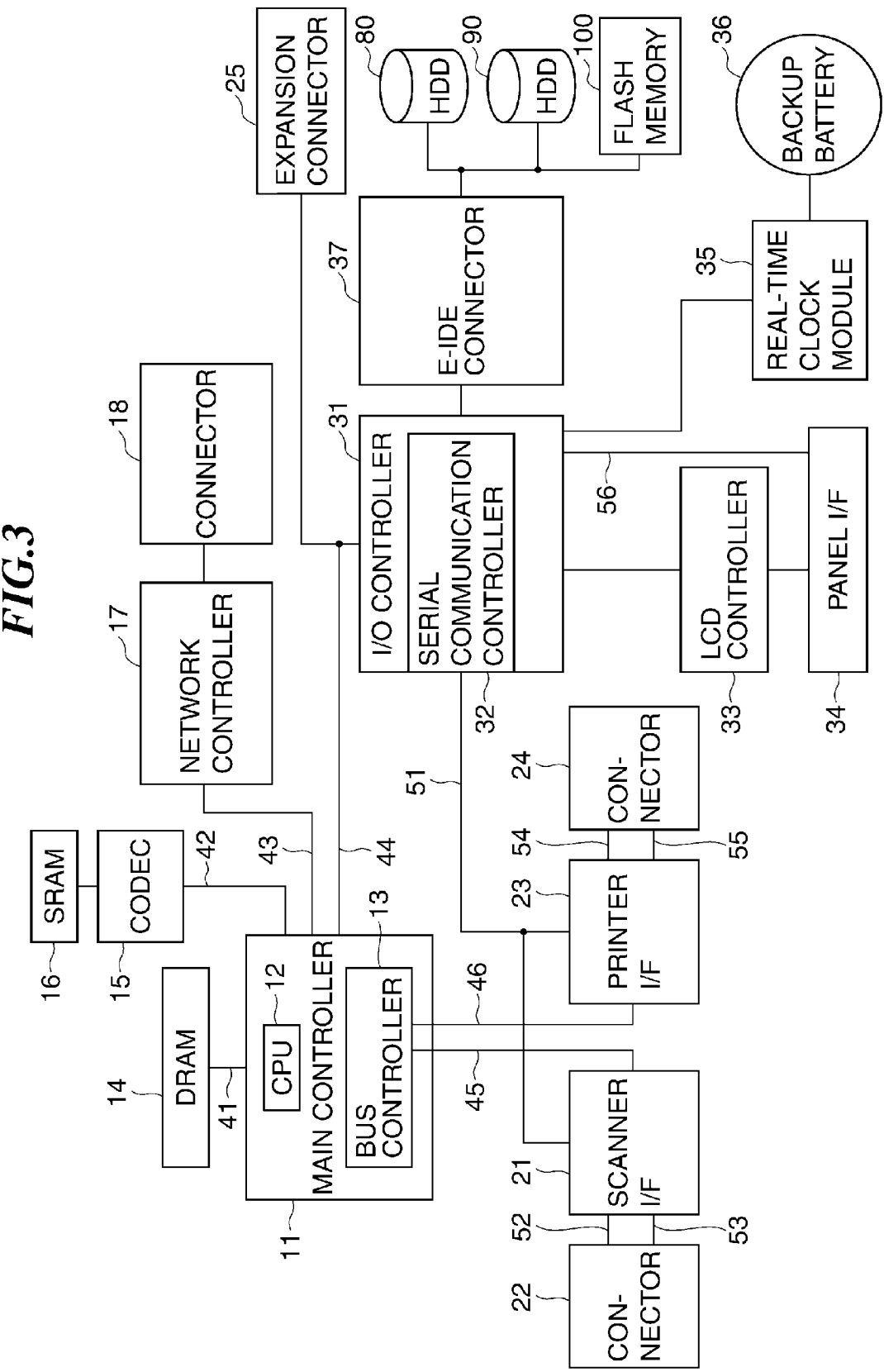
FIG. 3 is a block diagram showing an example construction of a control unit of the image forming apparatus.

The image forming apparatus 1 has an HDD (hard disk drive) 80 and has an HDD 90 and a flash memory 100, which are shown in FIG. 3. The HDD 80 is stored with a control program, various settings, and image data, which are associated with the image forming apparatus 1.

The image forming apparatus 1 has functions such as a copy function to cause the printer unit 60 to print image data read by the reader unit 50, an image data transmission function to convert image data read by the reader unit 50 into code data and transmit the code data to the PC 3 or 4 through the LAN 2, and a printer function to cause the control unit 10 to convert code data (print data) received from the PC 3 or 4 through the LAN 2 into image data and transmit the image data to the printer unit 60 and cause the printer unit 60 to print the image data onto a sheet.

Figure 2:
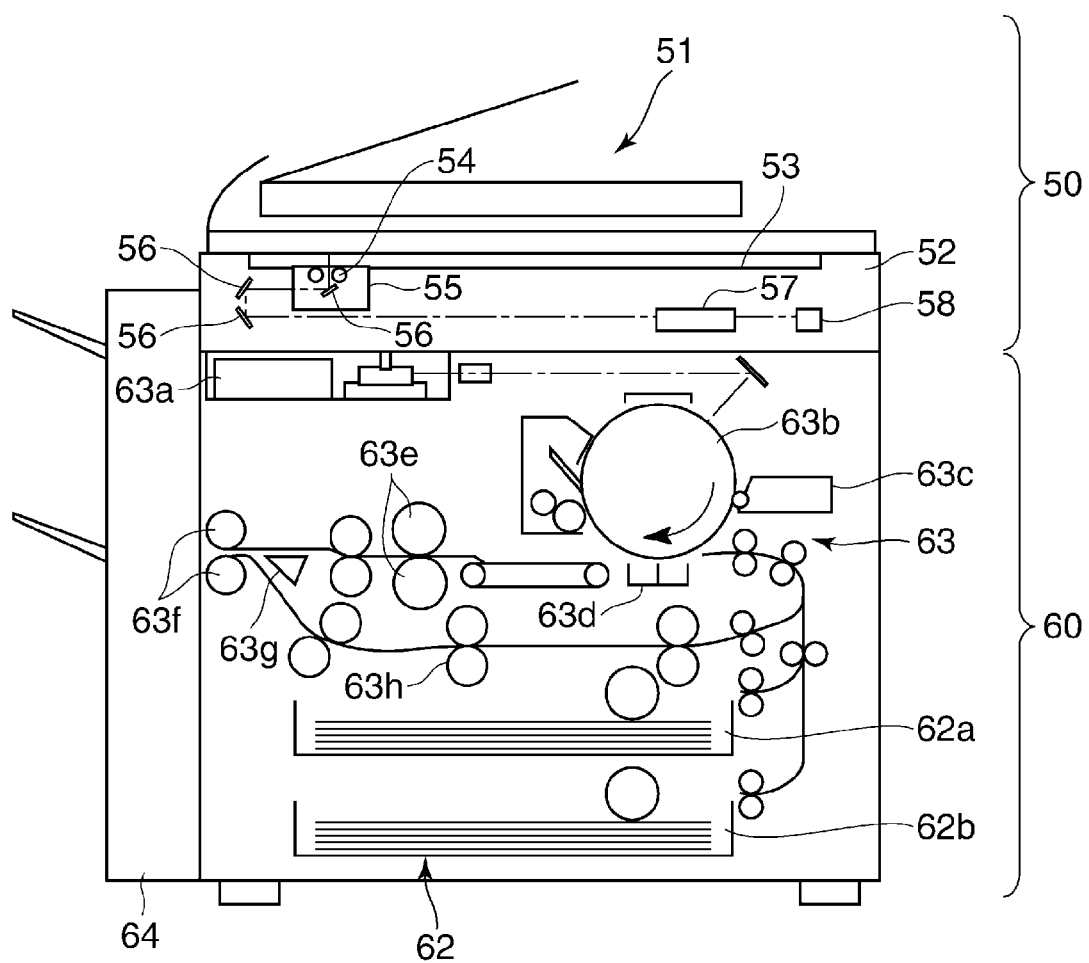
FIG. 2 is a section view schematically showing a reader unit and a printer unit of the image forming apparatus.

FIG. 2 schematically shows in section view the reader unit 50 and the printer unit 60 of the image forming apparatus 1.

In the image forming apparatus 1, the reader unit 50 is disposed upward of the printer unit 60. Originals placed on the DF unit 51 of the reader unit 50 are fed onto a platen glass 53 one by one by the DF unit 51.

When an original is conveyed onto the platen glass 53 by the DF unit 51, a lamp 54 provided in an optical unit 55 of the reader unit 50 is lit, and the optical unit 55 is moved from the left to the right in FIG. 2 to scan the original.

Reflection light from the original is guided through mirrors 56 and a lens 57 to an image sensor 58, and an optical image is formed on the image sensor 58 (e.g., CCD) that photoelectrically converts the optical image into an image signal, which is A/D converted into a digital image signal. The digital image signal is subjected to predetermined processing, and the resultant image data is transferred to the control unit 10.

The image of the original is read as described above. Thereafter, the original is discharged from the platen glass 53. It should be noted that an image of an original manually placed on the platen glass 53 is read when a start button provided in the image forming apparatus 1 is pressed.

In the printer unit 60, a laser emitter 63a outputs laser light according to image data under the control of the control unit 10. A photosensitive drum 63b of the marking unit 63 is scanned by the laser light, whereby an electrostatic latent image is formed on the photosensitive drum 63b according to the image data.

The electrostatic latent image formed on the photosensitive drum 63b is developed to a toner image by a developing device 63c. On the other hand, a recording sheet is fed from the sheet feed cassette 62a or 62b of the sheet feed unit 62 in synchronism with the start of laser light irradiation, and conveyed to a transfer device 63d where the toner image formed on the photosensitive drum 63b is transferred to the recording sheet. Then, the recording sheet is conveyed to a fixing device 63e where the recording sheet is heated and pressurized, whereby the toner image is fixed onto the recording sheet.

In the case of single-sided printing, the recording sheet passing through the fixing device 63e is discharged by a discharge roller 63f to a sheet discharge unit 64. In the case of double-sided printing, the discharge roller 63f is reversely rotated when the recording sheet has been conveyed to the discharge roller 63f, and the recording sheet is guided to a sheet refeed conveyance path through a flapper 63g. The recording sheet passes through the sheet refeed conveyance path 63h and is again conveyed to the transfer device 63d where the recording sheet is printed at its rear surface. Then, the recording sheet is discharged to the sheet discharge unit 64.

FIG. 3 shows in block diagram an example construction of the control unit 10.

As shown in FIG. 3, the control unit 10 includes a main controller 11 that has a CPU 12, a bus controller 13, and I/F (interface) controller circuits, not shown. The CPU 12 and the bus controller 13 control operations of the control unit 10.

The CPU 12 interprets code data such as PDL (page description language) received from the PC 3 or 4, and the bus controller 13 controls bus arbitration and DMA data transfer, for example.

The main controller 11 is connected with a DRAM 14 via a DRAM I/F 41 and also connected with a codec 15 via a codec I/F 42. The DRAM 14 is used as a work area for operation of the CPU 12 and used as an image data storage area. The codec 15 compresses raster image data stored in the DRAM 14 using a method such as MH, MR, MMR, JBIG, or JPEG, and decompresses code data compressed and stored in the DRAM 14 to raster image data.

A SRAM (storage unit) 16 is used as a temporary work area for the codec 15. DMA transfer of data between the SRAM 16 and the DRAM 14 is controlled by the bus controller 13.

A network controller 17 is connected to the main controller 11 via a network controller I/F 43 and connected to an external network (e.g., LAN 2) via a connector 18.

An expansion connector 25 for connection with an expansion board and an I/O controller 31 are connected to the main controller 11 through a general-purpose high-speed bus 44 such as a PCI bus. The I/O controller 31 includes a 2-channel asynchronous serial communication controller 32 for exchanging control commands between the reader unit 50 and the printer unit 60. The I/O controller 31 is connected through an I/O bus 51 to a scanner I/F 21 and to a printer I/F 23.

Reference numeral 34 denotes a panel I/F for transmitting and receiving data to and from the operation unit 70. The panel I/F 34 transfers, to the operation unit 70, image data transferred from an LCD controller 33, and transfers a key input signal, which is input through any of the hard keys or through the touch panel of the operation unit 70, to the I/O controller 31 through a key input I/F 56.

A real-time clock module 35 is supplied with power from a backup battery 36, and updates/stores date and time managed in the image forming apparatus 1. An E-IDE connector 37 is connected with the HDDs (hard disk drives) 80, 90 and the flash memory (nonvolatile storage unit) 100.

The flash memory 100 stores, e.g., addresses that represent storage areas in which a control program for the main controller 11 and various data are stored.

The CPU 12 stores image data into the HDD 80 or 90 through the I/O controller 31 and the E-IDE connector 37, and reads image data from the HDD 80 or 90.

Connectors 22, 24 are connected with the reader unit 50 and the printer unit 60, respectively. The connector 22 is connected to the scanner I/F 21 through an asynchronous serial I/F 52 and a video I/F 53. The connector 24 is connected to a printer I/F 28 though an asynchronous serial I/F 54 and a video I/F 55.

The scanner I/F 21 is connected through the connector 22 to the reader unit 50 and connected through the scanner bus 45 to the main controller 11. The scanner I/F 21 performs predetermined processing on image data received from the reader unit 50, and generates a control signal based on a video control signal received from the reader unit 50. The control signal is output to the scanner bus 45. Data transfer from the scanner bus 45 to the DRAM (volatile storage unit) is controlled by the bus controller 13.

The printer I/F 23 is connected through the connector 24 to the printer unit 60 and connected through a printer bus 46 to the main controller 11. The printer I/F 23 performs predetermined processing on image data output from the main controller 11 and outputs the resultant data to the printer unit 60. Raster image data developed on the DRAM 14 is DMA transferred to the printer unit 60 through the printer bus 46, printer I/F 23, video I/F 55, and connector 24 under the control of the bus controller 13.

Figure 4:
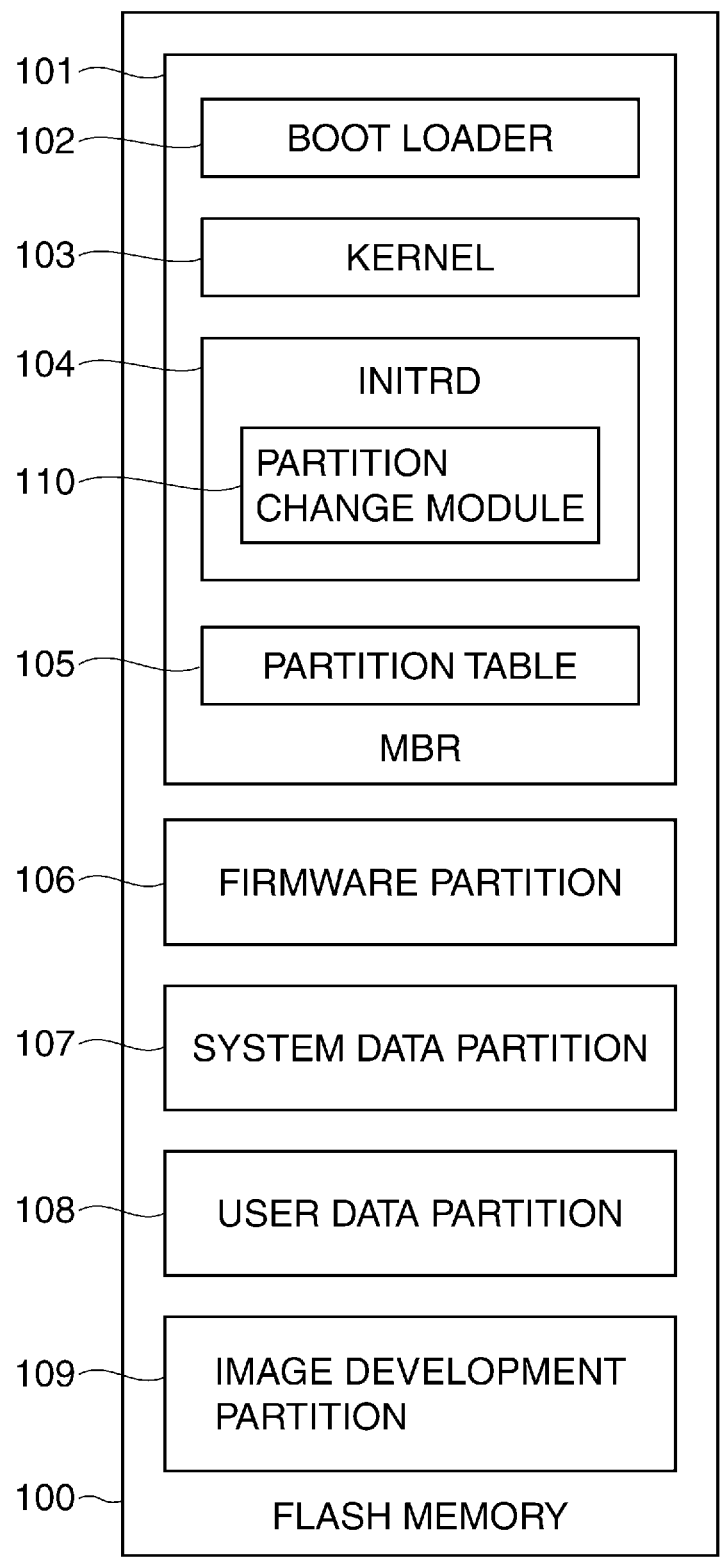
FIG. 4 is a view showing an example of program allocation in a flash memory of the control unit.

FIG. 4 shows an example of program allocation in the flash memory 100.

The flash memory 100 is provided with an MBR (master boot record) 101, firmware partition 106, system data partition 107, user data partition 108, and image development partition 109. In other words, the flash memory 100 is divided into a plurality of partitions.

The MBR 101 is recorded and placed on the first sector of the flash memory 100 independently of the partitions. The MBR 101 includes a boot loader 102, kernel 103, initrd (initial ramdisk) 104, and partition table 105.

The boot loader 102 is read by the CPU 12 from the flash memory 100 into the DRAM 14 at startup of the image forming apparatus 1, and other files required for the startup are read by the boot loader 102. The kernel 103 and the initrd 104 are read into the DRAM 14 by the boot loader 102. The kernel 103 is the core of the OS (operating system) and starts other modules on the file system, where required, thereby providing required functions.

When the initrd 104 (which is a small-scale file system) is developed on the DRAM 14, a file operation can be performed independently of the flash memory 100. A partition change module 110, which is software having a partition change function, is placed on the initrd 104. The partition change module 110 is capable of operating independently of the flash memory 100 and capable of changing partitions of the flash memory 100.

The partition table 105 is a table for partition configuration management and holds partition size information and partition information before change that represents partition start addresses in the flash memory 100.

The firmware partition 106 is an area that holds system software such as the OS and holds application software for achieving functions such as a print function and a copy function. The firmware partition 106 is mounted by the kernel 103 at the time of ordinary operation and randomly accessed at the time of OS operation.

The system data partition 107 is an area that holds data used by the system software. The user data partition 108 is an area that holds data used by the application software. The image development partition 109 is an area that holds temporarily developed data for image processing. Each of the system data partition 107, user data partition 108, and image development partition 109 is mounted by the kernel 103 and used for data reading and writing, where required.

Figure 5:
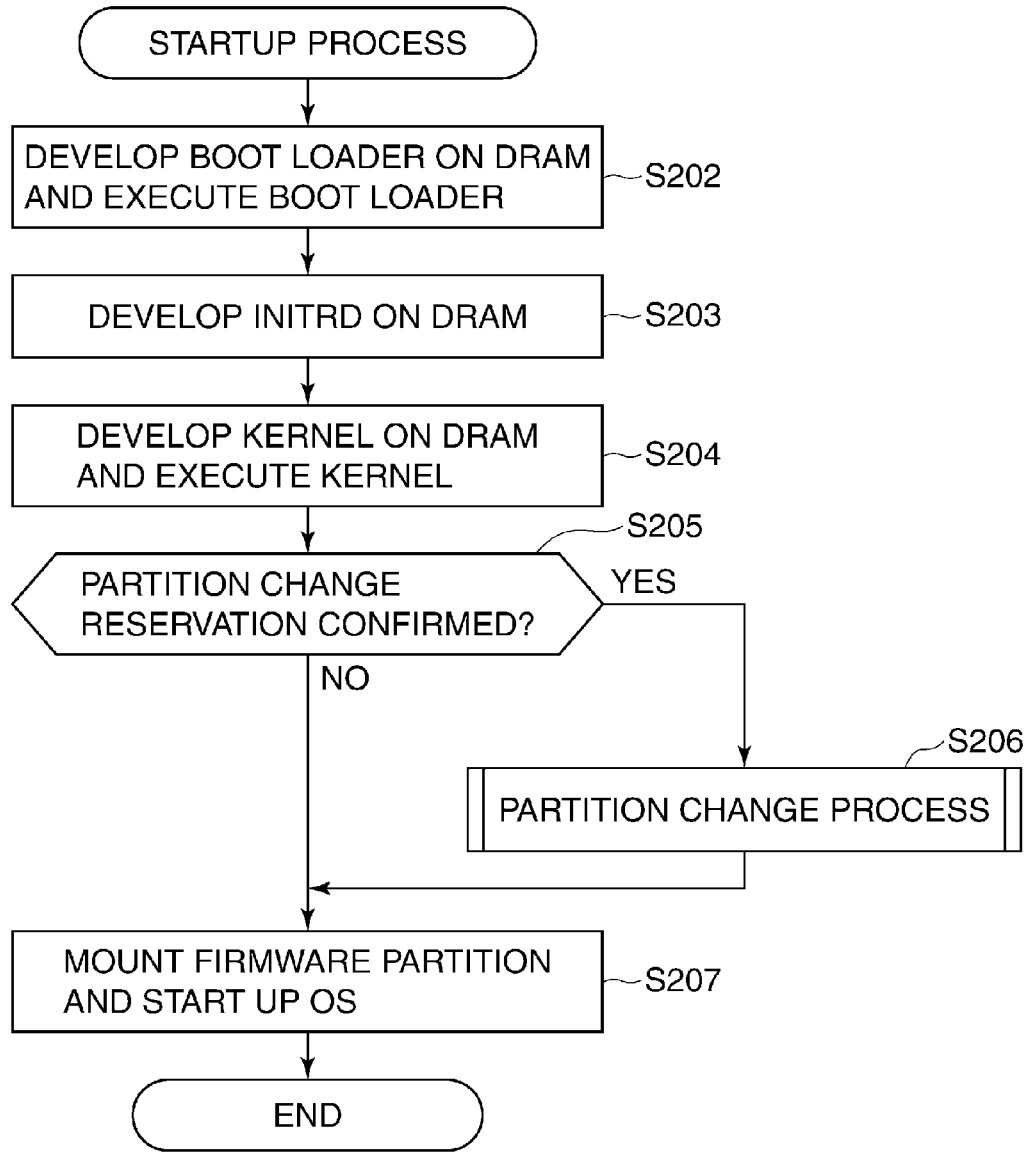
FIG. 5 is a flowchart showing a startup process executed by a CPU of the control unit.

FIG. 5 shows in flowchart a startup process executed by the CPU 12 (more specifically, by the boot loader 102, kernel 103, and initrd 104 that run on the CPU 12).

When the power supply to the image forming apparatus 1 is switched on, the startup process shown in FIG. 5 is started. The CPU 12 develops the boot loader 102 on the DRAM 14 from the flash memory 100 and starts the boot loader 102 (step S202). Next, the boot loader 102 develops the initrd (initial ramdisk) 104 on the DRAM 14 from the flash memory 100 (step S203), and develops the kernel 103 on the DRAM 14 from the flash memory 100 and starts the kernel 103 (step S204). The kernel 103 starts the partition change module 110 of the initrd 104.

The partition change module 110 refers to the SRAM 16 and confirms whether a partition change is reserved (step S205). A partition change reservation is registered in the SRAM 16 for example when an instruction is given by a user operation after the preceding startup or registered in the SRAM 16 at a predetermined version upgrade start timing according to a version upgrade function of the image forming apparatus 1. The partition change reservation contains partition information after change that represents a partition placement after change.

If a partition change is not reserved (if NO to step S205), the flow proceeds to step S207. On the other hand, if a partition change is reserved (if YES to step S205), the partition change module 110 performs a partition change process (which will be described later with reference to FIG. 6) in a state where the flash memory 100 (startup disk) is not mounted (step S206). Upon completion of the partition change process, the CPU 12 mounts the firmware partition 106 and starts up the OS (step S207), whereupon the startup process is completed.

Figure 6:
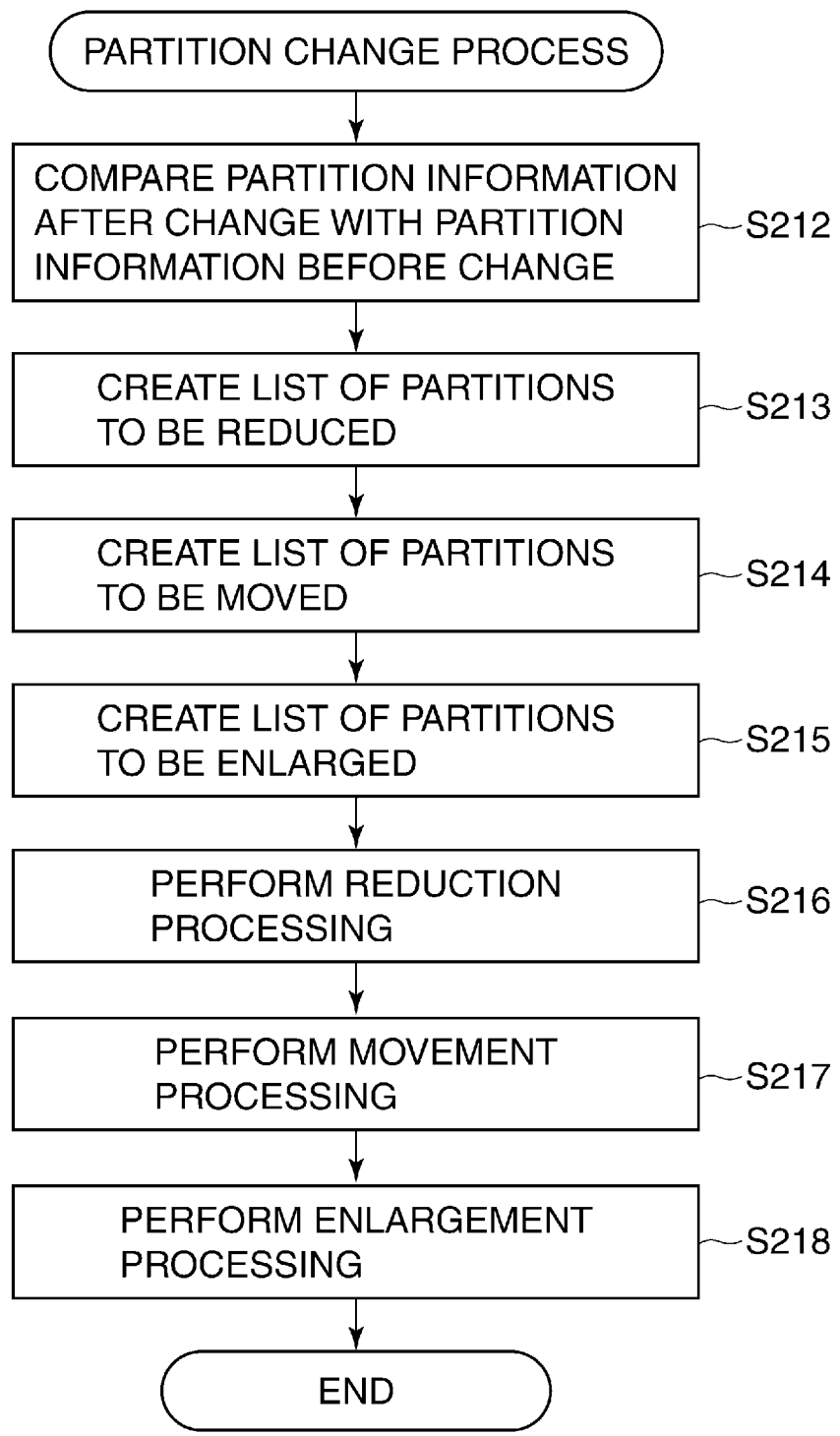
FIG. 6 is a flowchart showing in detail a partition change process executed in the startup process.

FIG. 6 shows in detail in flowchart the partition change process executed by the partition change module 110 in step S206 in FIG. 5.

At start of the partition change process, the partition change module 110 compares the partition information after change recorded in the SRAM 16 with the partition information before change recorded in the partition table 105 (step S212). Based on a result of the comparison, the partition change module 110 confirms partitions for each of which partition change processing (reduction processing or movement processing or enlargement processing) is required, and holds into the SRAM 16 a partition change processing status representing what processing is to be performed on which partitions.

Next, the partition change module 110 creates a list of partitions for which reduction processing is required (step S213), creates a list of partitions for which movement processing is required (step S214), and creates a list of partitions for which enlargement processing is required (step S215).

In this manner, the partition change module 110 decides whether each partition is a partition for which reduction processing is required or a partition for which movement processing is required or a partition for which enlargement processing is required.

Next, the partition change module 110 performs reduction processing on one or more partitions while referring to the reduction partition list (step S216), performs movement processing on one or more partitions while referring to the move partition list (step S217), and performs enlargement processing on one or more partitions while referring to the enlargement partition list (step S218), whereupon the partition change process is completed.

As described above, the reduction processing, movement processing, and enlargement processing are executed in this order in the partition change process. Accordingly, for example, even if a total partition size is nearly equal to an upper limit size (capacity) of the flash memory 100, partitions can be changed without causing data loss.

Since, as described above, partitions of the flash memory 100 (startup disk) are changed in a state that only the file system on the DRAM 14 operates, mismatching of the file system does not occur during the execution of the partition change, whereby the partition change can be executed without provision of a plurality of startup disks, and accordingly costs can be reduced.

Second Embodiment

In the partition change process of the first embodiment, pieces of data in the to-be-changed partition (s) of the flash memory 100 are moved in sequence to change the physical placement of the partition (s) on the flash memory 100. Accordingly, it takes several minutes to execute the partition change process. If the power supply to the image forming apparatus 1 is shut down during the execution of the partition change process and the partition change process is interrupted, it becomes unknown as to up to which sector of the concerned partition the movement process has been executed. Thus, it becomes impossible to restore data of that partition.

In a second embodiment of this invention, a data save process is performed to avoid data loss due to power supply shutdown during the execution of partition change process. It should be noted that an image forming apparatus of the second embodiment is basically the same in construction as that of the first embodiment, and a description thereof will be omitted.

Figure 7:
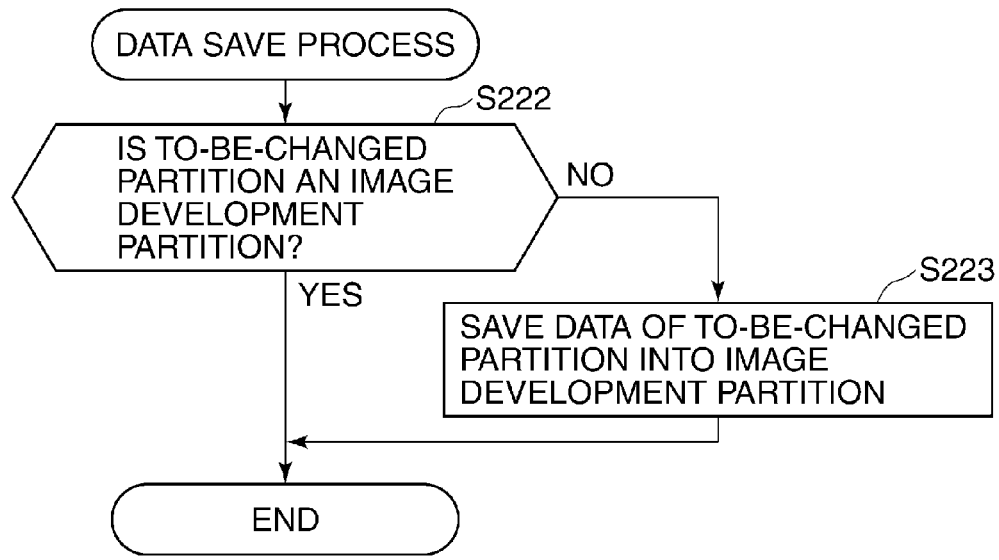
FIG. 7 is a flowchart showing a data save process executed by an image forming apparatus according to a second embodiment of this invention.

FIG. 7 shows in flowchart a data save process executed by the partition change module 110 of the image forming apparatus of this embodiment.

When power supply to the image forming apparatus 1 is switched on, a startup process corresponding to the startup process shown in FIG. 5 is performed. If it is determined in a step corresponding to step S205 that partition change is reserved, the partition change module 110 determines whether the to-be-changed partition is the image development partition 109 based on the partition information after change contained in the partition change reservation (step S222).

After the start of the startup process and before the start of the partition change process, no data is stored in the image development partition 109. It should be noted that the image development partition 109 is larger in size than other partitions.

Accordingly, if the to-be-changed partition is not the image development partition 109 (if NO to step S222), the partition change module 110 saves data of the to-be-changed partition into the image development partition 109 (step S223), whereupon the data save process is completed.

On the other hand, if the to-be-changed partition is the image development partition 109 (if YES to step S222), the data save process is immediately completed since no data is stored in the image development partition 109 and data saving is not required. Upon completion of the data save process, a partition change process corresponding to the partition change process performed in step S206 of FIG. 5 is started.

In the partition change process, as previously described with reference to FIG. 6, a partition change processing status and partition lists are held in the SRAM 16 (which is comprised of, e.g., NVRAM). Even if the power supply to the image forming apparatus is shut down, it is possible to confirm, based on the partition change processing status held in the SRAM 16 before the power supply shutdown, whether or not partition change processing was being performed at the power supply shutdown. If partition change processing was being performed at the power supply shutdown, it is possible to confirm, based on the partition change processing status, what partition change processing (reduction processing or movement processing or enlargement processing) was being performed on which of partitions. It is also possible to confirm, based on the partition lists held in the SRAM 16 before the power supply shutdown, the partition change processing that is to be executed again after the power supply shutdown.

Figure 8:
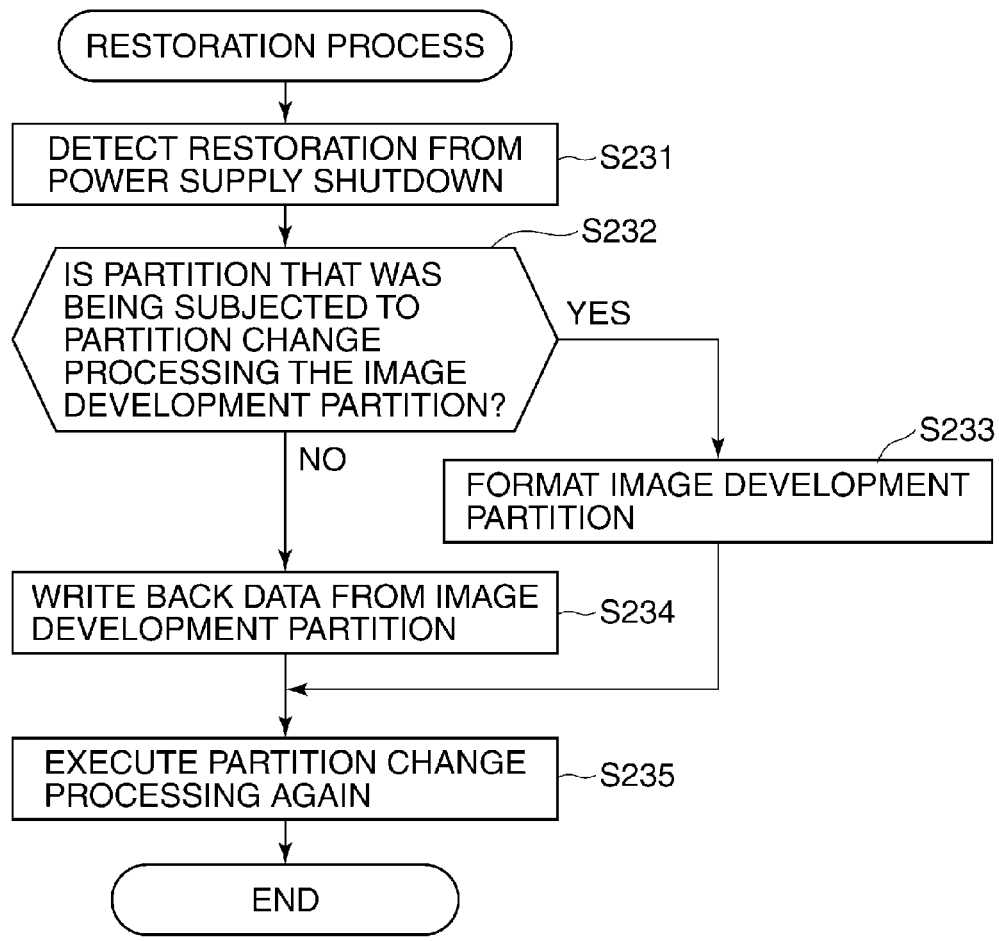
FIG. 8 is a flowchart showing a restoration process executed by the image forming apparatus of the second embodiment after power supply shutdown.

FIG. 8 shows in flowchart a restoration process executed by the image forming apparatus of this embodiment after power supply shutdown.

If power supply to the image forming apparatus 1 is shut down, the partition change module 110 confirms the partition change processing status held in the SRAM 16 before the power supply shutdown, and detects restoration from the power supply shutdown (step S231). Next, the partition change module 110 determines based on the partition change processing status whether or not the partition change processing was being performed at the power supply shutdown, and if it is determined that the partition change processing was being performed at the power supply shutdown, determines whether the partition that was being subjected to the partition change processing is the image development partition 109 (step S233).

If the partition that was being subjected to the partition change processing at the power supply shutdown is the image development partition 109 (if YES to step S232), data in the image development partition 109 is not one saved into the image development partition 109 in the data save process (FIG. 7), which was executed at the startup of the image forming apparatus before the power supply shutdown. Therefore, the data in the image development partition 109 is not required to be written back. Accordingly, the partition change module 110 formats the image development partition 109 (step S233), whereupon the flow proceeds to step S235.

On the other hand, if the partition that was being subjected to the partition change processing at the power supply shutdown is not the image development partition 109 (if NO to step S232), the partition change module 110 writes the partition data, which was saved into the image development partition 109 in the data save process performed before the power supply shutdown, back into the partition from which the data was saved (step S234), thereby restoring the data placement state before the partition change processing. In other words, if the change of a partition other than the image development partition 109 is interrupted, the partition change module 110 writes data saved into the image development partition 109 back into a partition from which the data was saved, whereby the data of the to-be-changed partition is restored. Then, the flow proceeds to step S235.

In step S235, based on the partition lists held in the SRAM 16 before the power supply shutdown, the partition change module 110 confirms the partition change processing (reduction processing or movement processing or enlargement processing) that is to be executed again after the power supply shutdown, and again executes the partition change processing (step S235), whereupon the restoration process is completed.

As described above, in the second embodiment, a firmware update (including partition change) can be performed at the time of version upgrade of firmware of the image forming apparatus 1, while using only one startup disk. Furthermore, even if the power supply to the image forming apparatus 1 is shut down during the execution of the partition change processing, the partition change processing can be started again. Accordingly, the firmware can safely be updated, while improving the performance.

As apparent from the foregoing description, the I/O controller 51 and the main controller 11 in the above-described embodiments function as a development unit of this invention defined in the claims. The partition change module 110 running on the CPU 12 functions as a change unit, restoration unit, and judgment unit of this invention that are defined in the claims.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-265907, filed Dec. 5, 2011, which is hereby incorporated by reference herein in its entirety.

What is claimed is:

1. An image forming apparatus comprising:
   a printing unit configured to perform printing;
   a volatile storage unit;
   a nonvolatile storage unit configured to be stored with a file system and divided into a plurality of partitions, wherein the plurality of partitions include at least an image development partition in which an image to be printed by the printing unit is developed;
   a development unit configured to develop the file system on the volatile storage unit; and
   a change unit configured to change at least one to-be-changed partition of the plurality of partitions of the nonvolatile storage unit by using the file system developed by the development unit,
   wherein the change unit saves data of the to-be-changed partition into the image development partition, and changes the to-be-changed partition after the data has been saved into the image development partition,
   wherein a data save process is not performed for the image development partition, when the to-be-changed partition is the image development partition, before the change of image development partition, and
   wherein the image development partition is larger in size than the other partitions of the plurality of partitions.

2. The image forming apparatus according to claim 1, further including:
   a restoration unit configured to use the data saved into the image development partition to restore the data of the to-be-changed partition in a case where the partition change by the change unit is interrupted.

3. The image forming apparatus according to claim 1, wherein the development unit develops the file system on the volatile storage unit when the information processing apparatus is started.

4. The image forming apparatus according to claim 1, further including:
   a judgment unit configured to judge whether partition change is required when the information processing apparatus is started,
   wherein in a case where it is judged by the judgment unit that partition change is required, the change unit changes the to-be-changed partition of the nonvolatile storage unit.

5. The image forming apparatus according to claim 1, wherein the development unit is configured to develop the file system on the volatile storage unit before an operating system of the image forming apparatus is started.

6. The image forming apparatus according to claim 5, wherein the change unit is configured to change the at least one to-be-changed partition before the operating system of the image forming apparatus is started.

7. A control method for an image forming apparatus having a printing unit that performs printing, a volatile storage unit, and a nonvolatile storage unit stored with a file system and divided into a plurality of partitions that include at least an image development partition in which an image to be printed by the printing unit is developed, the method comprising:
   developing the file system on the volatile storage unit; and
   changing at least one to-be-changed partition of the plurality of partitions of the nonvolatile storage unit by using the file system developed in the developing,
   wherein in the changing, data of the to-be-changed partition is saved into the image development partition and the to-be-changed partition is changed after the data has been saved into the image development partition,
   wherein in the changing, a data save process is not performed for the image development partition, when the to-be-changed partition is the image development partition, before the change of image development partition, and
   wherein the image development partition is larger in size than the other partitions of the plurality of partitions.

8. A non-transitory computer readable storage medium storing a program to execute a control method for an image forming apparatus having a printing unit that performs printing, a volatile storage unit, and a nonvolatile storage unit stored with a file system and divided into a plurality of partitions that include at least an image development partition in which an image to be printed by the printing unit is developed, the method comprising:
   developing the file system on the volatile storage unit; and changing at least one to-be-changed partition of the plurality of partitions of the nonvolatile storage unit by using the file system developed in the developing, wherein in the changing, data of the to-be-changed partition is saved into the image development partition and the to-be-changed partition is changed after the data has been saved into the image development partition, wherein in the changing, a data save process is not performed for the image development partition, when the to-be-changed partition is the image development partition, before the change of image development partition, and wherein the image development partition is larger in size than the other partitions of the plurality of partitions.

* * * * *